US010075814B2

(12) United States Patent
Sydir et al.

(10) Patent No.: US 10,075,814 B2
(45) Date of Patent: Sep. 11, 2018

(54) LOCATION-BASED SELECTION OF WIRELESS PERIPHERAL DEVICES

(71) Applicant: Intel Corporation, Santa Clara, CA (US)

(72) Inventors: Jaroslaw J. Sydir, San Jose, CA (US); Anthony G. Lamarca, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 13/726,375

(22) Filed: Dec. 24, 2012

(65) Prior Publication Data

US 2014/0179230 A1    Jun. 26, 2014

(51) Int. Cl.
*H04W 24/00* (2009.01)
*H04W 4/02* (2018.01)
*H04M 1/725* (2006.01)
*H04L 29/08* (2006.01)
*H04W 4/04* (2009.01)

(52) U.S. Cl.
CPC ....... *H04W 4/025* (2013.01); *H04L 29/08657* (2013.01); *H04L 67/22* (2013.01); *H04M 1/72569* (2013.01); *H04M 1/72572* (2013.01); *H04W 4/043* (2013.01)

(58) Field of Classification Search
CPC ......... H04M 1/72569; H04M 1/72572; H04W 4/02; H04W 4/025; H04W 8/18; H04W 8/22; H04W 12/10; H04W 48/04; H04W 48/08; H04L 29/08657

USPC .......... 455/456.1, 456.2, 456.3, 456.6, 411, 455/414.1

See application file for complete search history.

(56) References Cited

U.S. PATENT DOCUMENTS

| 5,635,940 | A | * | 6/1997 | Hickman et al. | 342/389 |
| 5,642,303 | A | * | 6/1997 | Small et al. | 708/109 |
| 6,359,711 | B1 | * | 3/2002 | Cole et al. | 398/58 |
| 7,242,491 | B2 | * | 7/2007 | Nakayasu et al. | 358/1.15 |
| 8,326,793 | B1 | * | 12/2012 | Bowers et al. | 706/62 |
| 8,773,691 | B2 | * | 7/2014 | Shirai | 358/1.15 |
| 2002/0051178 | A1 | * | 5/2002 | Nakayasu et al. | 358/1.15 |
| 2006/0234758 | A1 | * | 10/2006 | Parupudi et al. | 455/550.1 |
| 2007/0124436 | A1 | * | 5/2007 | Shepherd | 709/223 |

(Continued)

FOREIGN PATENT DOCUMENTS

| CN | 1638312 A | 7/2005 |
| CN | 1996413 A | 7/2007 |

(Continued)

OTHER PUBLICATIONS

International Search Report and Written Opinion received for PCT Application No. PCT/US2013/047801, dated Oct. 17, 2013, 15 pages.

(Continued)

*Primary Examiner* — Duc M Nguyen
(74) *Attorney, Agent, or Firm* — Schiff Hardin LLP

(57) ABSTRACT

Based upon the present location and historical usage at that location, the technologies disclosed herein select a wireless peripheral device (e.g., a printer, monitor, keyboard) for wireless connection with a portable device (e.g., a laptop computer or tablet). This Abstract is submitted with the understanding that it will not be used to interpret or limit the scope or meaning of the claims.

25 Claims, 6 Drawing Sheets

(56) References Cited

U.S. PATENT DOCUMENTS

| | | | |
|---|---|---|---|
| 2007/0299796 A1* | 12/2007 | Macbeth et al. | 706/16 |
| 2008/0080457 A1* | 4/2008 | Cole | 370/342 |
| 2008/0146265 A1 | 6/2008 | Valavi | |
| 2008/0151847 A1* | 6/2008 | Abujbara | 370/338 |
| 2009/0141695 A1* | 6/2009 | Karaoguz | G06Q 10/0637 370/338 |
| 2011/0177831 A1 | 7/2011 | Huang | |
| 2011/0295998 A1* | 12/2011 | Ferris et al. | 709/224 |
| 2012/0052817 A1* | 3/2012 | Lee | H04W 52/0258 455/68 |
| 2012/0058782 A1* | 3/2012 | Li | 455/456.2 |
| 2012/0170560 A1 | 7/2012 | Han et al. | |
| 2012/0296986 A1 | 11/2012 | Hassan et al. | |
| 2012/0329474 A1* | 12/2012 | Seavey et al. | 455/456.1 |
| 2014/0180576 A1* | 6/2014 | LaMarca | G01C 21/3484 701/465 |

FOREIGN PATENT DOCUMENTS

| | | |
|---|---|---|
| CN | 102202192 A | 9/2011 |
| WO | 2012/053790 A2 | 4/2012 |
| WO | 2014/105179 A1 | 7/2014 |

OTHER PUBLICATIONS

International Preliminary Report on Patentability and Written Opinion Received for PCT Patent Application No. PCT/US2013/047801, dated Jul. 9, 2015, 12 pages.
Office Action dated Sep. 26, 2017 for Chinese Patent Application No. 201380060108.3.

* cited by examiner

LOCATION-BASED SELECTION OF WIRELESS PERIPHERAL DEVICES

BACKGROUND

It seems as though wireless computers (e.g., laptops, tablets, etc.) are increasingly populating the world. Of course, by their nature, such computers connect wirelessly to wireless peripheral devices. A wireless peripheral device is one that wirelessly connects to a computer while it provides input to that computer or receives output from that computer. Examples include wireless printer, wireless keyboard, wireless mouse, and wireless display or projector.

After the initial wireless-connection setup (which may involve providing a passcode) of the computer and the wireless peripheral device, a user may use the wireless peripheral device with the computer. For example, Tanya's laptop utilizes a defined pairing mechanism to establish communication with a Bluetooth-based keyboard in a conference room when Tanya first uses the keyboard found in that conference room.

When the Tanya returns to the conference room, her computer may use a conventional re-connection approach. To avoid redundant manual setup process, a conventional re-connection approach may be called "connect to a previously-used peripheral the next time it is in range" or "reconnect to known peripheral upon detect." As the name implies, this approach involves the computer reconnecting to a known wireless peripheral device whenever that device is in range.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
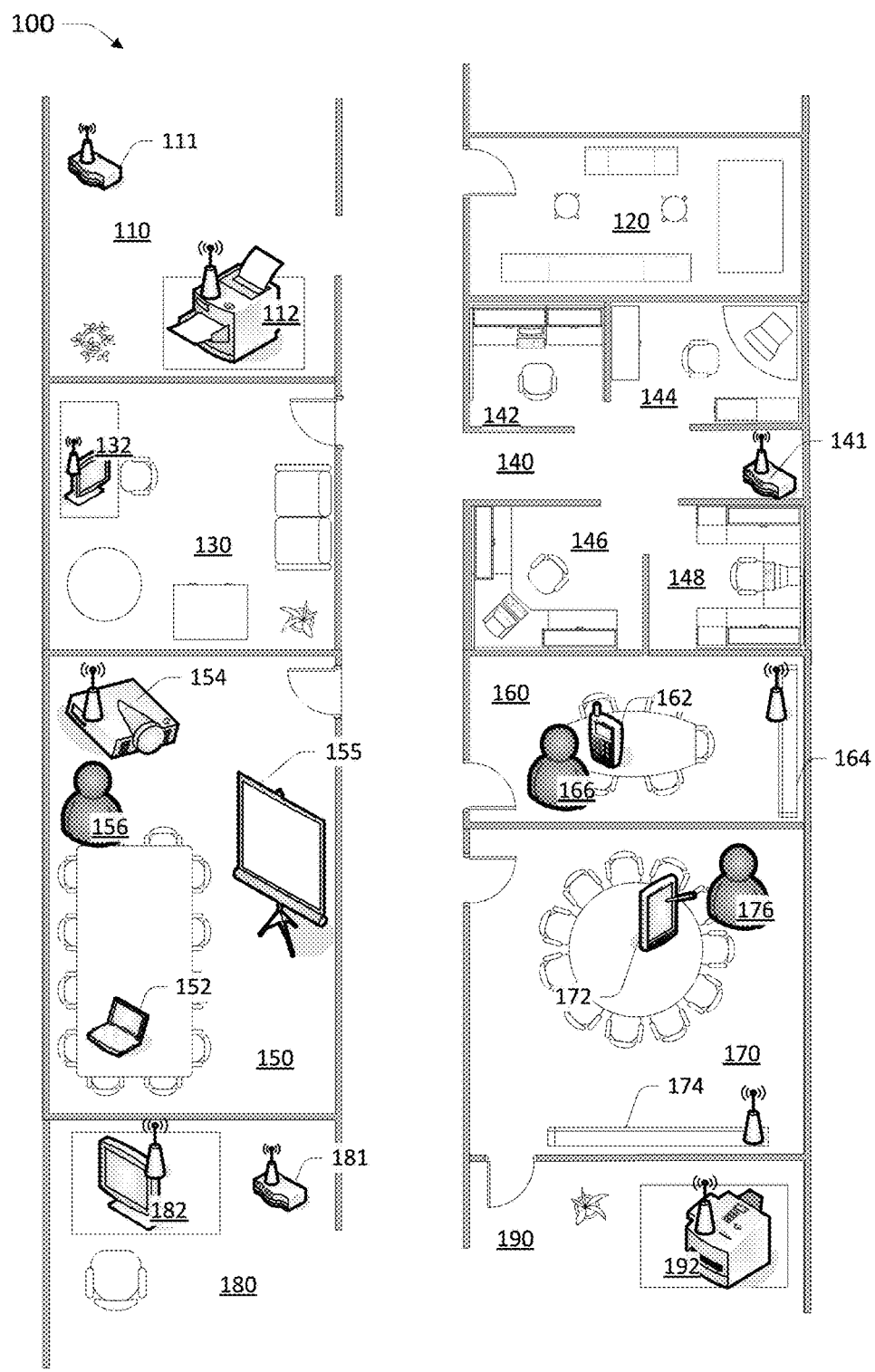
FIG. 1 shows an example scenario that illustrates an environment in which implementations in accordance with the description herein may operate.

Based upon the present location and historical usage at that location, the technologies disclosed herein select a wireless peripheral device (e.g., a printer, monitor, or keyboard) for wireless connection with a portable device (e.g., a laptop computer or tablet). The described technologies track historical usage of wireless peripherals based upon estimated locations of such usage. Upon return to the same location, the described technologies select one or more wireless peripherals for connection to the portable device. The selection is based upon historical usage of such peripherals at that location.

Using the technology described herein, a portable device learns about the usage of wireless peripheral devices at specific localized location. The portable device leverages the prior-usage information upon return to the now-known specific localized location to make decisions regarding binding with wireless peripherals available at that location.

In one or more implementations, the specific localized location is little more than the space in which a person would sit or stand. It may, for example, be about one to three meters in diameter. To denote the very localized nature of such a location, it may be called a "spot" or "personal place" herein.

Using the technology described herein, the portable device defines its location based, at least in part, upon signal fingerprint of ambient identifiable wireless signal (IWS) sources observed at that location. The ambient IWS sources are part of a topography of such IWS sources that are located within reception range at a location. An example of an IWS sources is a wireless access point (WAP).

Signal Fingerprinting

One or more implementations of the technologies described herein utilize a signal fingerprinting approach to learn a specific location and recognize it again. One or more of the implementations described herein utilize a particular form of signal fingerprinting called WiFi-based positioning. It is more commonly called "WiFi fingerprinting." Generally, WiFi fingerprinting involves memorizing a location based upon the WAP "fingerprint" of "visible" WAPs and their observed signal strengths.

Conventionally, WiFi fingerprinting involves a detailed survey of the radio landscape in which the WAP identifications and observed signal-strengths are collected in a dense grid by sampling throughout the localization area. Each fingerprint is associated with the location at which it was observed. Once an area has had its fingerprint map created, a typical portable device can perform a WiFi scan, perform a map lookup, and estimate its location within that area with a typical accuracy of one to three meters. WiFi fingerprinting techniques are low power, accurate and work with WiFi-enabled devices.

However, construction of a conventional WiFi fingerprint map is time consuming. Constructed in this conventional way, the WiFi fingerprint map is only useful for the area in which it was collected. Interpolation is not possible for more than a few meters beyond the map. As a result, conventional WiFi fingerprinting is typically used in houses and small buildings, but rarely or never deployed in large buildings, on campus-wide scale, and over a city.

Example Scenario

The popularity of device-to-device wireless communication is skyrocketing due to three factors: the proliferation of personal mobile devices, the dropping cost of adding wireless networking to devices and an increasing frustration with cables and physical connectors. As a result, wireless communications are replacing cables for many computer input/output (I/O) peripheral devices such as printers, projectors, displays, input devices, speakers, etc.

Such wireless peripheral devices (or simply "wireless peripherals") are becoming more prevalent as their density within office, home, and school environments increases. Given the tendency of these devices to use medium-range network technologies like Bluetooth, Zigbee or WiFi, it is becoming increasingly common for a mobile computing device to be able to "hear" (i.e., receive a wireless signal) and connect to many different wireless peripherals from any given place.

FIG. 1 shows an example scenario 100 for illustrating implementations of the technology described herein. It is also used to illustrate the drawbacks of conventional approaches.

In particular, the example scenario 100 is an office floorplan. The floorplan includes a workspace 110, a workroom 120, an office 130, a cubical farm 140, conference rooms 150, 160, and 170, an office 180, and a conference-room-adjoining workspace 190.

Workspace 110 includes a WAP 111 and a wireless printer 132. Office 130 includes a computer system 132. Cubical farm 140 includes a WAP 141 and four cubicles 142, 144, 146, and 148. Each cubical includes a computer system. Conference room 150 includes a laptop computer 152, a wireless projector 154 with screen 155, and a user 156. Conference room 160 includes a smartphone 162, a large wireless flatscreen monitor 164, and a user 166. Conference room 170 includes a tablet 172, a large wireless flatscreen monitor 166, and a user 176. Each of the projector 154, monitor 166, and monitor 176 may be equipped with INTEL® wireless display (WiDi) technology to enable a portable device (such as tablet 172) to wirelessly connected thereto. Office 180 includes a WAP 181 and a wireless computer monitor 182. Workspace 190 includes a wireless printer 192.

The user 176 in conference room 170 most likely wants to connect her tablet 172 to the wireless flatscreen monitor 174 to, for example, make a presentation. The user 176 in conference room 170 is unlikely to want to connect to monitor 164 in the neighboring conference room 160.

However, depending on the building materials used and the specific radio environment, it is likely that both wireless monitors 164 and 174 are in range to her tablet 172 while user 176 is in conference room 170. Furthermore, presuming that entire floorplan is for the same company, the user is likely to be allowed to connect to any of the projectors, monitors, and other wireless peripherals.

Consequently, it may not be abundantly clear to user 176 to which wireless peripheral to connect. Signal strength is not a reliable indicator. Indeed, since monitor 164 is closer to tablet 172, the strength of the signal coming from monitor 164 in the neighboring room may be stronger than that received from monitor 174. A simply priority list may be insufficient because monitor 164 may have a higher priority (e.g., by default or as specified by the user), but its use is not desirable by user 176 when she is in a different room than monitor 164.

Similarly, it may be much more convenient for user 176 to use the printer 192 than printer 112 because printer 192 is in room adjoining the conference room 170 that she is in. Normally, she might want to use printer 112 when she is in any other part of the floor. So, having printer 112 as the default printer for her tablet 172 is typically acceptable. However, when she is in conference room 170, she would rather use printer 192.

Existing approaches for an automated selection of wireless peripherals require the user to find some identification (e.g., media access card or MAC address) on the peripheral that she wishes to use. Once identified, she must find that peripheral from a list of such peripherals in range and select it.

The examples discussed above illustrate the problem with the conventional "reconnect to known peripheral upon detect" approach. Indeed, it is likely that all users (e.g., users 156, 166, and 176) would have reason to connect to each of the wireless peripherals (e.g., monitor 164, projector 154, printer 112, etc.) at some time since each is likely move about the floor when working. Most likely, these wireless peripherals are network-visible from many of the rooms and spaces on the floor. Consequently, the conventional approaches fail miserably.

One conventional approach is to have, for example, the user 156 manually check to make sure that the wireless peripheral that he is connecting to is the peripheral in the conference room 150 where he is sitting. Over time, the user 156 can learn the names of the peripherals in each of the conference rooms that he commonly visits and the information technology (IT) department can name the peripheral in a way to make it easier to determine which one is in which conference room. However, this process requires manual effort on the part of the user each time and offers no automation or learning.

Another conventional approach is to augment the peripherals and/or portable devices to be able to directly detect that they are in proximity to each other. In this way, the mobile device can determine which peripheral of the desired type is in the same room. Proximity technologies include visible and infrared light and both audible sounds and ultrasound. Unfortunately, these proximity technologies are not widely available. In addition, these proximity technologies do not typically work when a portable device is stored away (e.g., in a bag or a pocket), and thus require all devices to be brought out before they could connect.

Still another conventional approach is to use a precision location technology to indirectly infer proximity: the portable devices utilize a generalized high-precision indoor location technology to track their exact location and knowledge of the resources available in each room and then make a pairing/connecting decision. This conventional approach requires an expensive custom location technology (such as ultra-wideband [UWB] or ultrasonic time-of-flight [TOF]). Alternatively, this conventional approach requires an extensive, time-consuming signal-fingerprint map to be created when a signal-fingerprint technology is used.

Unlike the conventional approaches, the technology described herein associates specific locations (e.g., personal places) with particular wireless resources (e.g., wireless peripherals) accessed by a user of a portable device at those specific personal places. The portable device may determine personal places by WiFi fingerprints. For example, smartphone 162 may note its location based upon identifying and gauging the signal strength of WAPs 111, 141, and 181.

The portable device keeps track of the particular wireless resources accessed by the user and the associated WiFi fingerprints to determine whether a particular resource is accessed repeatedly from the same location or distinct set of locations. With the technology described herein, the portable device effectively builds a custom location-based index to the resources commonly accessed by the user and can then help the user by automating the process of accessing those resources when the user is at a given location.

Example System

Figure 2:
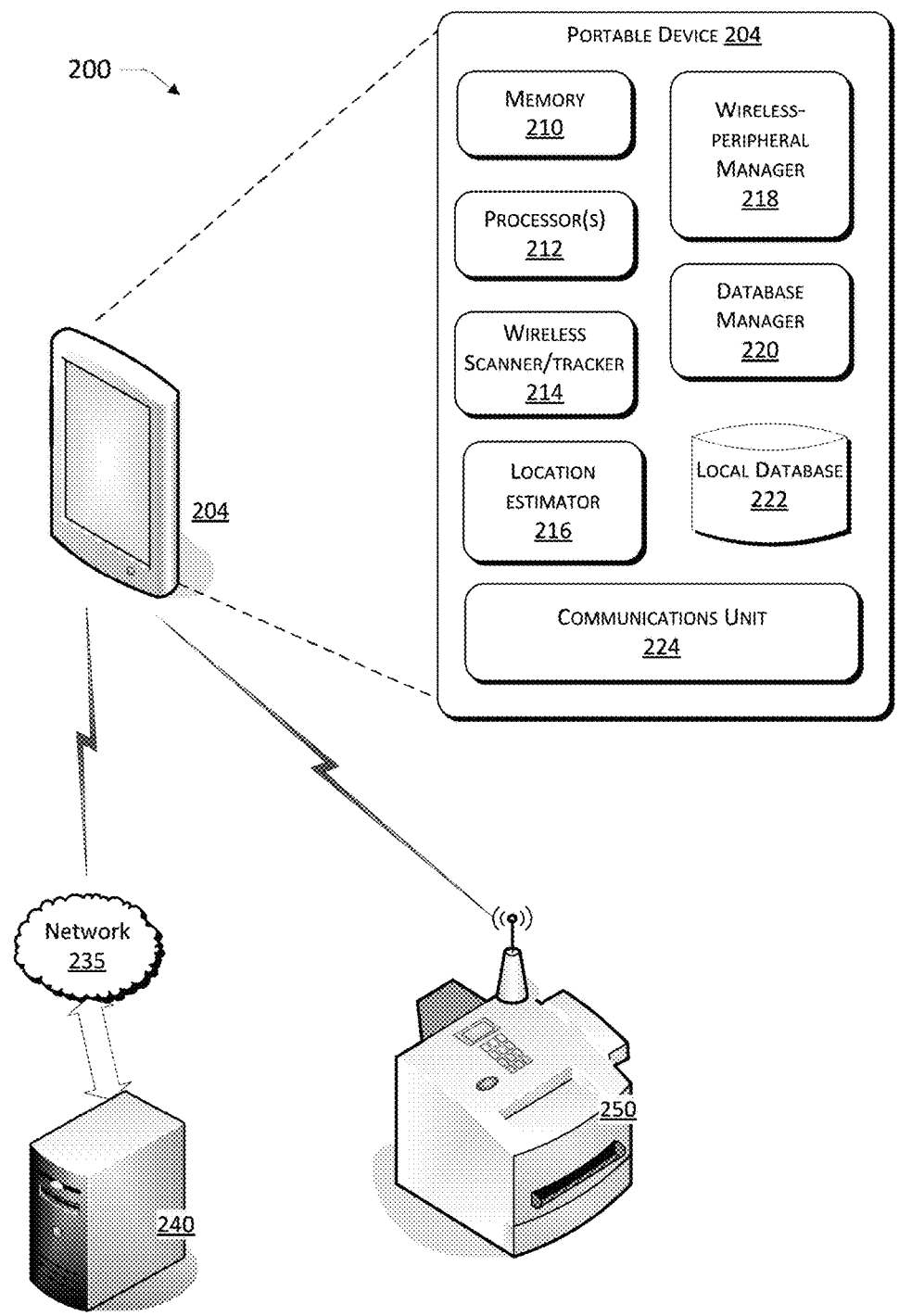
FIG. 2 illustrates an example system in accordance with one or more implementations described herein.

FIG. 2 illustrates example system 200 for implementing the technology described herein. The system 200 includes a portable device 204 (such as a tablet computer), a network 235, a network server 240, and a wireless peripheral device 250 (such a wireless multi-function printer).

As depicted, the portable device 204 includes a memory 210, one or more processor(s) 212, a wireless scanner/tracker 214, a location estimator 216, a wireless-peripheral manager 218, a database manager 220, a local database 222, and a communications unit 224. These functional components may be separate or some combination of hardware units. Alternatively, the components may be implemented, at least in part, in software and thus be stored in the memory 210 and executed by the processors 212.

The wireless scanner 214 scans for ambient IWS sources when requested to do so by the location estimator 216. The scanner 214 helps identify the encountered ambient IWS sources that are observed at a location. When it observes an ambient IWS source, the wireless scanner 214 detects that ambient IWS source and identifies its unique identification (e.g., BSSID, MAC address, semantic name of "Home," etc.) and the signal strength or RSSI that was observed for this IWS source.

Rather than calculate geo-physical or "real world" location, the location estimator 216 relies upon an observation of the surrounding characteristic of a particular location to sufficiently distinguish it from other locations. In some implementations, the location estimator 216 generates one or more signal fingerprints based upon the ambient IWS sources and determines whether the signal fingerprint obtained at the current location matches one of the fingerprints stored in the database 222. In some implementations, the scanner/tracker 214 and location estimator 216 are the same component.

The wireless-peripheral manager 218 detects usage of wireless peripheral devices (such as wireless peripheral device 250) by the portable device 204. Such usage includes initial binding or pairing setup between peripheral devices and the portable device 204. It also includes timing information about such usage. Timing information includes, for example, day used (e.g., Monday, weekend, weekday, etc.), time of usage (8 AM, morning, lunch, during workday, etc.), how long (e.g., two minutes, five hours, etc.), how frequent, and the like.

The database manager 220 creates an association between the wireless peripheral devices (such as wireless peripheral device 250) that are detected as being used with the locations where they are used. One or more signal fingerprints determined by the location estimator 218 may indicate the locations. The database manager 220 stores those associations in the local database 222. The database manager 220 may also store other usage information (such as timing information) in association with association of the peripherals and its location of use.

The local database 222 may be included in memory 210 or be its own separate storage system. The local database 222 is a local version of a location-peripheral database or, in some instances, a fingerprint-peripheral database. These databases store the associations between locations/fingerprints and the peripherals used at such locations. It also stores information about usage of peripherals at such locations.

The communications unit 224 may upload information in the local location/fingerprint-peripheral database (such as the local database 222) over the network 235 to the network server 240. Furthermore, the communications unit 224 may download other location/fingerprint-peripheral (and usage) information from the network server 240. Such information may have been gathered from other portable devices of the user. In this way, the user can gain the benefit of a history of peripheral use across multiple devices.

Similarly, the location/fingerprint-peripheral (and usage) information collected on the network server 240 may have been gathered from a large group of people. For example, such information may be gathered from everyone on a particular floor of an office building, everyone in a particular department, everyone that works for a particular company, and the like. In this way, the information is gathered a so-called "crowd" of people. This is called crowd-sourced information.

The network 235 may be a wired and/or wireless network. It may include the Internet infrastructure and it may be presented as the so-called "cloud." The network 235 may include wired or wireless local area network, a cellular network, and/or the like. The network 235 links the portable device 204 with the network server 240.

Although not shown, the portable device 204 also includes a graphics subsystem and a user input subsystem. The graphics subsystem is designed to display, in a user-interface, a listing of one or more wireless peripheral devices in an order based upon the prioritizing. The user input subsystem is designed to receive input from a user that indicates which of the one or more listed wireless peripheral devices that the user chooses to use.

Location-Peripheral Usage Learning Operations

Figure 3:
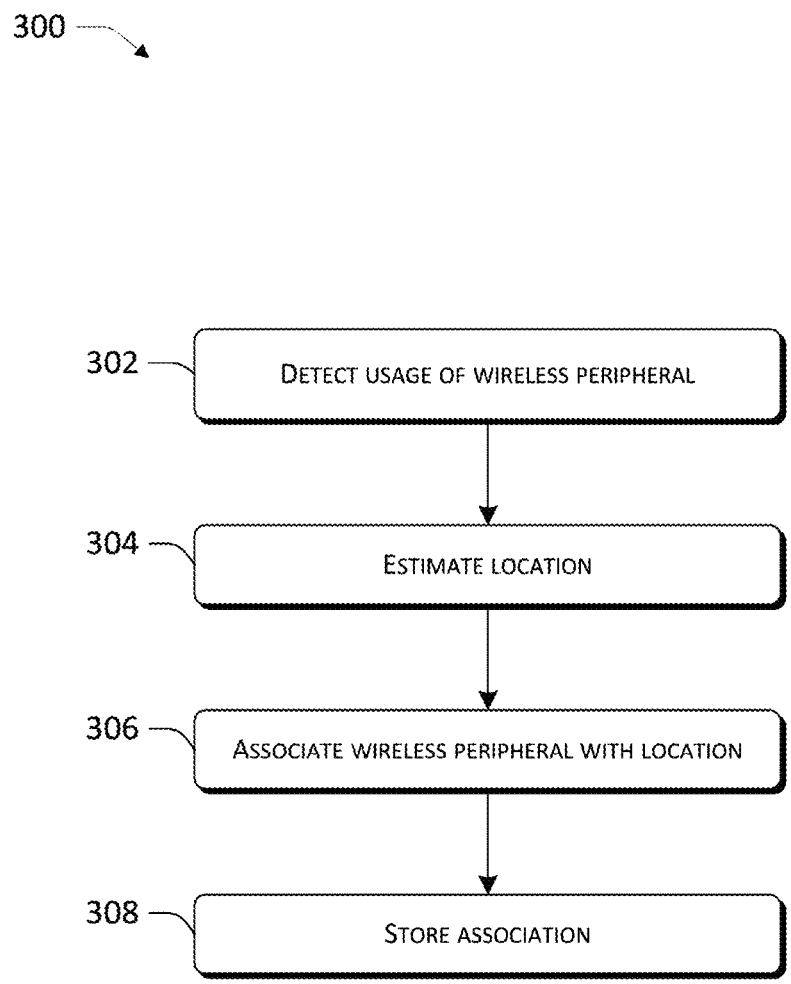
FIGS. 3 and 4 illustrate processes in accordance with one or more implementations described herein.

FIG. 3 illustrates an example process 300 for implementing, at least in part, the technology described herein. In particular, process 300 depicts location-peripheral usage operations of a portable device, such as the portable device 204.

At 302, the portable device 204 detects usage of a particular wireless peripheral device by a portable device.

At 304, the portable device 204 estimates a location of the portable device while the particular wireless peripheral device is being used. The portable device 204 may estimate a location by defining according to observable characteristics surrounding the location. To that end, the portable device 204 determines a signal fingerprint about the portable device. As part of doing that, the portable device 204 observes one or more ambient IWS sources. The determined signal fingerprint is based at least in part upon one or more of the observed ambient IWS sources.

At 306, the portable device 204 associates the particular wireless peripheral device with the estimated location. The determined signal fingerprint about the portable device 204 may define, at least in part, the estimated location while the particular wireless peripheral device is used at that location.

At 308, the portable device 204 stores the association between the particular wireless peripheral device and the estimated location into the location-peripheral database. Alternatively, this operation may be described as the portable device 204 storing the association between the particular wireless peripheral device and the determined signal fingerprint into the fingerprint-peripheral database.

As part of the storing operation 308, the portable device 204 may also store historical information about the usage of the particular wireless peripheral device with the location/fingerprint-peripheral database. The associations and historical usage information is stored in the local database 222 of the portable device 204.

In addition, the portable device 204 may send, via the network 235, the associations and historical usage information to a remote on the network server 240.

Location-Based Wireless Peripheral Selection Operations

Figure 4:
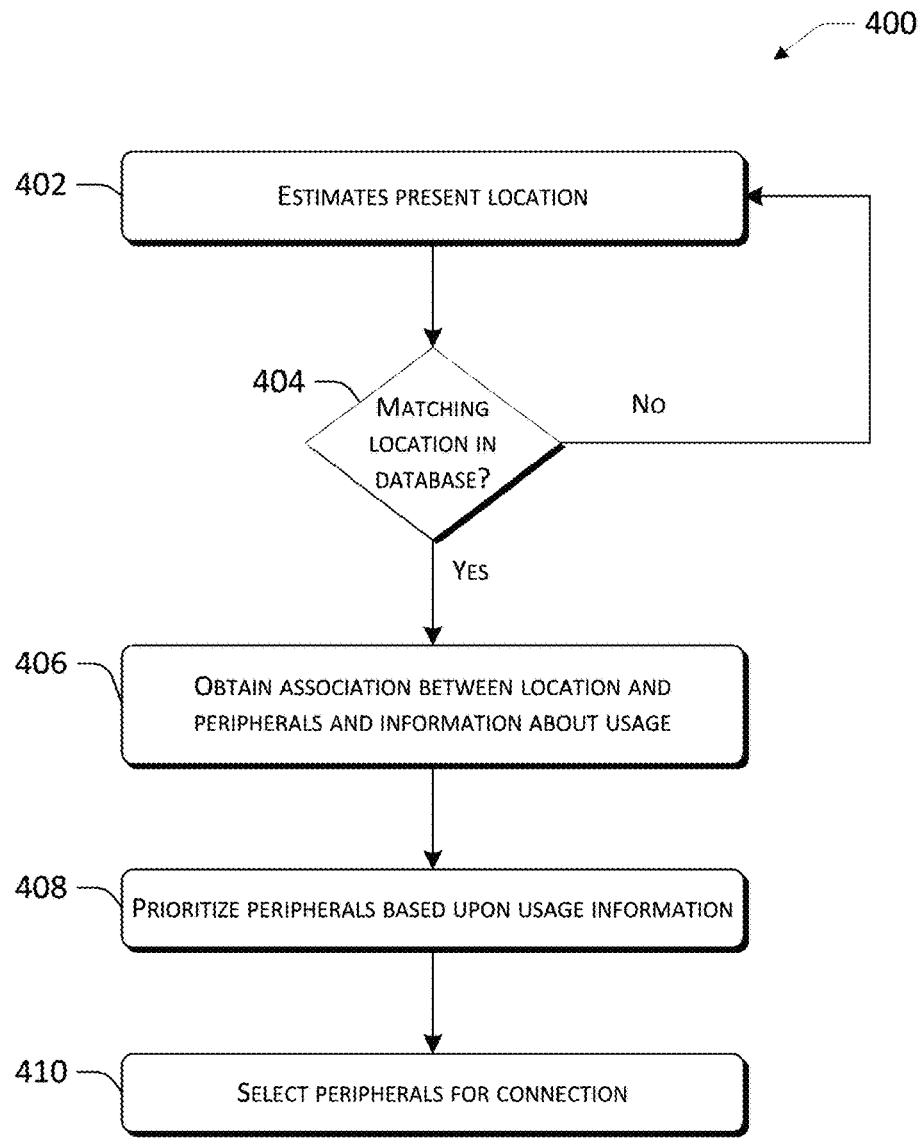

FIG. 4 illustrates an example process 400 for implementing, at least in part, the technology described herein. In particular, process 400 depicts location-based wireless peripheral selection operations of a portable device, such as portable device 204.

At 402, the portable device 204 estimates a present location of the portable device while the particular wireless peripheral device is being used. The portable device 204 may estimate the present location by defining according to observable characteristics surrounding the present location. To that end, the portable device 204 determines a signal fingerprint about the portable device. As part of doing that, the portable device 204 observes one or more ambient IWS sources. The determined signal fingerprint is based at least in part upon one or more of the observed ambient IWS sources.

At 404, the portable device 204 determines whether there is a match between the estimated present location with a location stored in a location-peripheral database. If not, then the process 400 returns back to the beginning operation 402 and awaits a change of location before attempting operation 404 again. If a match is found, then the process 400 precedes to the next operation, which is operation 406.

Alternatively, instead of the process 400 returning back to operation 402 if there is no match, the process may determine peripheral prioritization based on something other than location. For example, user input may determine priority.

At 406, the portable device 204 accesses the location-peripheral to obtain an association between one or more wireless peripheral devices and the matching location. In addition, the portable device 204 acquires information about prior usage of the one or more wireless peripheral devices from the location-peripheral database. The prior-usage information is stored, in the location-peripheral database, in association with one or more stored locations and the one or more wireless peripheral devices.

The location-peripheral database may be stored on a remote device, such in the "cloud." The location-peripheral database also may include association/information from several of the user's portable devices. In addition, the location-peripheral database may include crowd-sourced information.

At 408, the portable device 204 prioritizes the one or more wireless peripheral devices based upon the prior-usage information of the one or more wireless peripheral devices. In so doing, it orders the peripherals from based upon one or a combination of the timing or other usage information. Indeed, some information (e.g., like how long a peripheral is used) may receive more weight in the prioritization than others.

At 410, the portable device 204 selects one or more of the wireless peripherals to wirelessly connect thereto. While the portable device 204 may connect to multiple wireless peripherals concurrently at a given location, connection may be limited based upon some peripherals being of the same or similar category. For example, it may be desirable to connect to only one wireless projector at a time. If so, the portable device 204 may be configured in that manner.

The wireless connection between the portable device and one or more peripherals may occur automatically. That is, the connection may be triggered without specific input from the user to choose the particular highest priority wireless peripheral device.

Alternatively, the selection may made by the user. The portable device 204 may display, in a user-interface, a listing of one or more wireless peripheral devices in an order based upon the prioritization. The user chooses which of the one or more listed wireless peripheral devices that the user chooses to use. The portable device 204 receives that input and selects accordingly.

Example Computing Device

Figure 5:
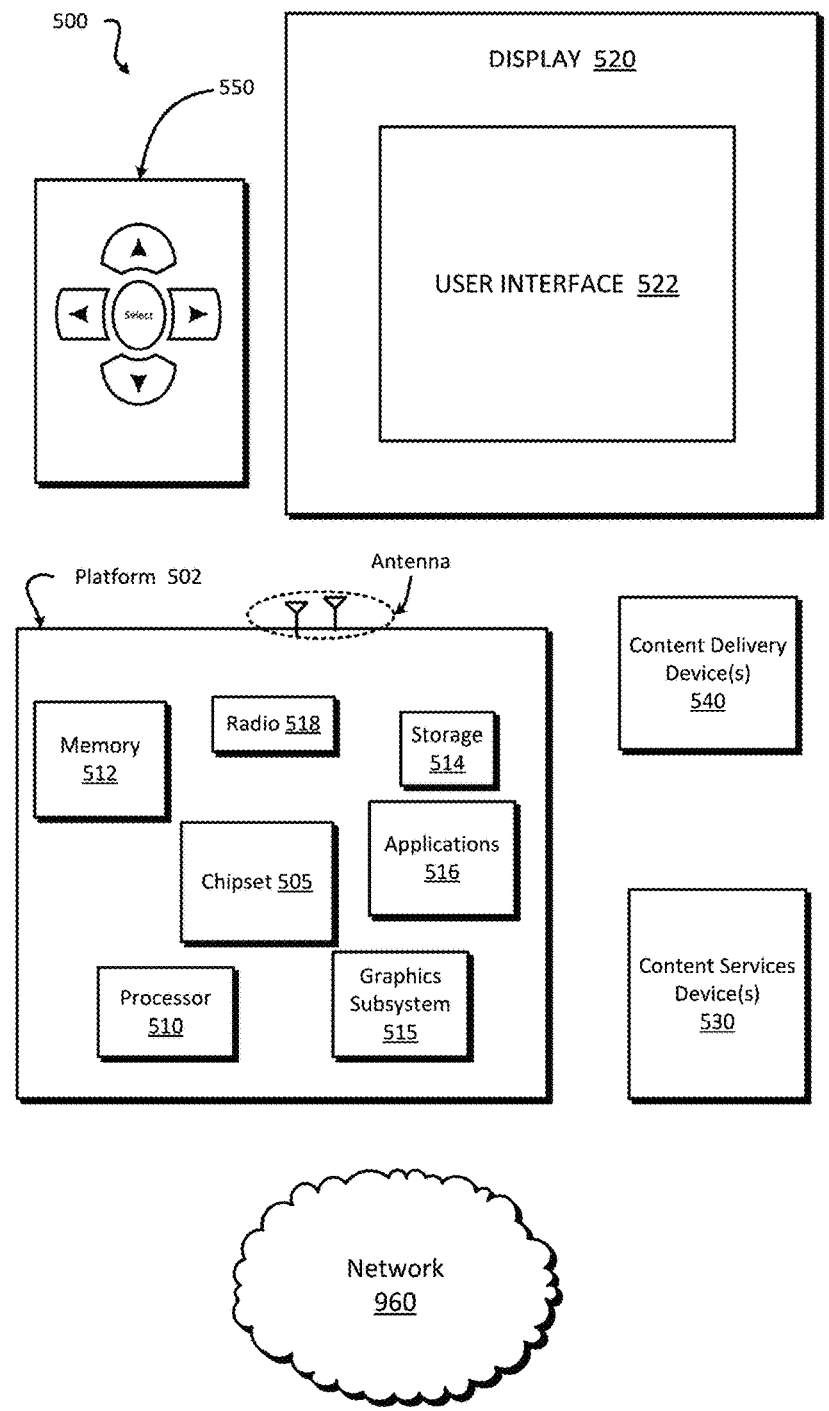
FIG. 5 illustrates an example computing device to implement in accordance with the technologies described herein.

FIG. 5 illustrates an example system 500 that may implement, at least in part, the technologies described herein. In various implementations, system 500 is a media system, although system 500 is not limited to this context. For example, system 500 can be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, or smart television), mobile internet device (MID), messaging device, data communication device, and so forth.

In various implementations, system 500 includes a platform 502 coupled to a display 520. Platform 502 receives content from devices such as content services device 530, content delivery device 540, or other similar content sources. A navigation controller 550 including one or more navigation features may be used to interact with, for example, platform 502 and/or display 520.

In various implementations, platform 502 includes any combination of a chipset 505, a processor 510, memory 512, storage 514, a graphics subsystem 515, applications 516 and/or radio 518. Chipset 505 provides intercommunication among processor 510, memory 512, storage 514, graphics subsystem 515, application 516, and/or radio 518. For example, chipset 505 can include a storage adapter (not depicted) capable of providing intercommunication with storage 514.

Processor 510 may be implemented as a complex instruction set computer (CISC) or reduced instruction set computer (RISC) processors, x86 instruction set compatible processors, multicore, or any other microprocessor or central processing unit (CPU). In various implementations, processor 510 may be dual-core processors, dual-core mobile processors, and so forth.

Memory 512 may be implemented as a volatile memory device such as, but not limited to, a random access memory (RAM), dynamic random access memory (DRAM), or static RAM (SRAM).

Storage 514 may be implemented as a nonvolatile storage device such as, but not limited to, a magnetic disk drive, optical disk drive, tape drive, an internal storage device, an attached storage device, flash memory, battery backed-up synchronous DRAM (SDRAM), and/or a network accessible storage device. In various implementations storage 514 includes technology to increase the storage performance-enhanced protection for valuable digital media when multiple hard drives are included.

Graphics subsystem 515 processes of images such as still or video for display. Graphics subsystem 515 can be a graphics processing unit (GPU) or a visual processing unit (VPU), for example. An analog or digital interface may be used to communicatively couple the graphics subsystem 515 and the display 520. For example, the interface can be a high-definition multimedia interface, display port, wireless high definition media interface (HDMI), and/or wireless HD-compliant techniques. Graphics subsystem 515 may be integrated into processor 510 or chipset 505. In some implementations graphics subsystem 515 may be a stand-alone card communicatively coupled to chipset 505.

The graphics and/or video processing techniques described herein are implemented in various hardware architectures. For example, graphics and/or video functionality may be integrated within a chipset. Alternatively, a discrete graphics and/or a video processor may be used. As still another implementation, the graphics and/or video functions may be provided by a general-purpose processor, including a multicore processor. In further embodiments, the functions may be implemented in a consumer electronics device.

Radio 518 may include one or more radios capable of transmitting and receiving signals using various suitable wireless communications techniques. Such techniques involve communications across one or more wireless networks. Example wireless networks include, but are not limited to, wireless local area networks (WLANs), wireless personal area networks (WPANs), wireless metropolitan area network (WMANs), cellular networks, and satellite networks. In communicating across such networks, radio 518 operates in accordance with one or more applicable standards in any version.

In various implementations, display 520 includes any television-type monitor or display. Display 520 may include, for example, a computer display screen, touch-screen display, video monitor, television-like device, and/or a television. Display 520 can be digital and/or analog. In various implementations, display 520 may be a holographic display. In addition, display 520 may be a transparent surface that receives a visual projection. Such projections convey various forms of information, images, and/or objects. For example, such projections may be a visual overlay for a mobile augmented reality (MAR) application. Under the control of one or more software applications 516, platform 502 can display user interface 522 on display 520.

In various implementations, content services device(s) 530 may be hosted by any national, international, and/or independent service and thus accessible to platform 502 via the Internet. Content services device(s) 530 may be coupled to platform 502 and/or to display 520. Platform 502 and/or content services device(s) 530 may be coupled to a network 560 to communicate media information to and from the network 560. Content delivery device(s) 540 also may be coupled to platform 502 and/or to display 520.

In various implementations, content services device(s) 530 include a cable television box, personal computer, network, telephone, Internet-enabled devices, appliances capable of delivering digital information and/or content, and any other similar device capable of unidirectionally or bidirectionally communicating content between content providers and platform 502 and/display 520, via network 560 or directly. The content can be communicated unidirectionally and/or bidirectionally to and from any one of the components in system 500 and a content provider via a network 560. Examples of content include any media information including, for example, video, music, medical and gaming information, and so forth.

Content services device(s) 530 receive content such as cable television programming including media information, digital information, and/or other content. Examples of content providers include any cable or satellite television or radio or Internet content providers. The provided examples are not meant to limit implementations in accordance with the present disclosure in any way.

In various implementations platform 502 may receive control signals from navigation controller 550 having one or more navigation features. The navigation features of controller 550 may be used to interact with user interface 522, for example. In some embodiments, navigation controller 550 may be a pointing device such as a computer hardware component, specifically a human interface device, that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 can be replicated on a display (e.g., display 520) by movements of a pointer, cursor, focus ring, or other visual indicators displayed on the display. For example, under the control of software applications 516, the navigation features located on navigation controller 550 can be mapped to virtual navigation features displayed on user interface 522. In some embodiments, controller 550 may not be a separate component but may be integrated into platform 502 and/or display 520. The present disclosure, however, is not limited to the elements or in the context shown or described herein.

In various implementations, drivers (not shown) include technology to enable users to instantly turn on and off platform 502 like a television with the touch of a button after initial boot up, when enabled. Program logic allows platform 502 to stream content to media adaptors or other content services device(s) 530 or content delivery device(s) 540 even when the platform is turned off. In addition, chipset 505 includes hardware and/or software support for 5.1 surround sound audio and/or high definition 5.1 surround sound audio, for example. Drivers may include a graphics driver for integrated graphics platforms. In some embodiments the graphics driver may comprise a peripheral component interconnect (PCI) express graphics card.

In various implementations any one or more of the components shown in system 500 can be integrated. For example, platform 502 and content services device(s) 530 can be integrated, or platform 502 and content delivery device(s) 540 can be integrated, or platform 502, content services device(s) 530, and content delivery device(s) 540 can be integrated. In various embodiments, platform 502 and display 520 can be an integrated unit. Display 520 and content service device(s) 530 can be integrated, or display 520 and content delivery device(s) 540 can be integrated. These examples are not meant to limit the present disclosure.

In various embodiments system 500 can be implemented as a wireless system, a wired system, or a combination of both. When implemented as a wireless system, system 500 can include components and interfaces suitable for communicating over a wireless shared media, such as one or more antennae, transmitters, receivers, transceivers, amplifiers, filters, control logic, and so forth. An example of wireless shared media includes portions of a wireless spectrum, such as the RF spectrum. When implemented as a wired system, system 500 can include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media can include a wire, cable, metal leads, printed circuit board (PCB), backplane, switch fabric, semiconductor material, twisted-pair wire, coaxial cable, fiber optics, and others.

Platform 502 can establish one or more logical or physical channels to communicate information. The information includes media information and control information. Media information refers to any data representing content meant for a user. Examples of content include data from a voice conversation, videoconference, streaming video, electronic mail ("e-mail") message, voice-mail message, alphanumeric symbols, graphics, image, video, text, and so on. Data from a voice conversation can be, for instance, speech information, silence periods, background noise, comfort noise, tones, and other similar items. Control information refers to any data representing commands, instructions, or control words meant for an automated system. For example, control information can be used to route media information through a system, or instruct a node to process the media information in a predetermined manner. The embodiments, however, are not limited to the elements or in the context shown or described in FIG. 5.

As described above, system 500 can be embodied in varying physical styles or form factors. FIG. 5 illustrates implementations of a small form-factor device 500 in which system 500 can be embodied. In embodiments, for example, device 500 can be implemented as a mobile computing device having wireless capabilities. A mobile computing device may refer to any device having a processing system and a mobile power source or supply, such as one or more batteries.

Examples of a mobile computing device, in addition to those already mentioned, also may include computers that are arranged to be worn by a person, such as a wrist computer, finger computer, ring computer, eyeglass computer, belt-clip computer, arm-band computer, shoe computers, clothing computers, and other wearable computers. In various embodiments, a mobile computing device can be implemented as a smart phone capable of executing computer applications, as well as voice communications and/or data communications. Although some embodiments can be described with a mobile computing device, other embodiments can be implemented using other wireless mobile computing devices as well. The embodiments are not limited in this context.

Figure 6:
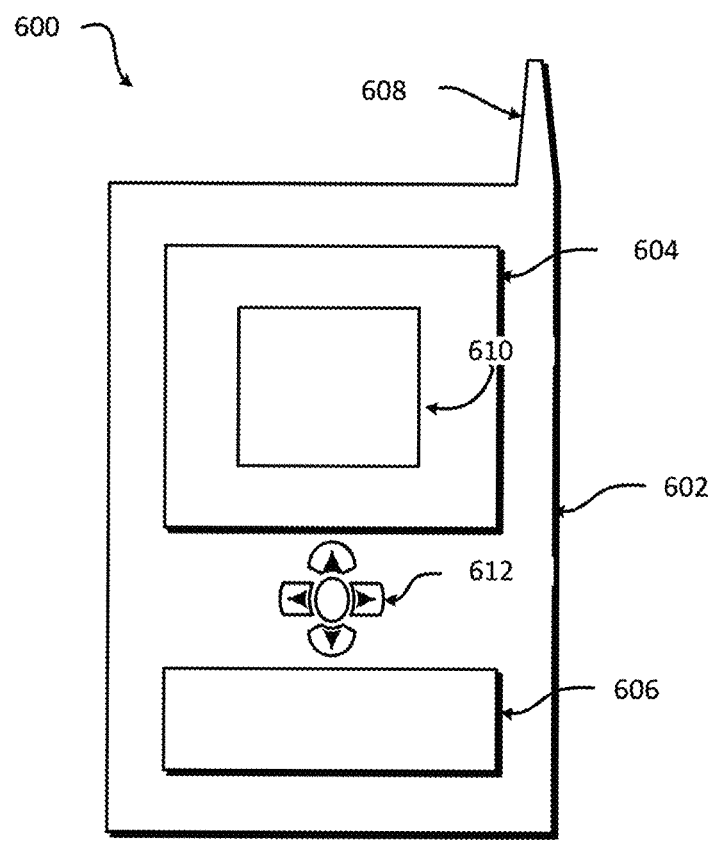
FIG. 6 illustrates an example device to implement in accordance with the technologies described herein.

As shown in FIG. 6, device 600 includes a housing 602, a display 604, an I/O device 606, and an antenna 608. Device 600 also includes navigation features 612. Display 604 includes any suitable display unit for displaying information appropriate for a mobile computing device. I/O device 606 includes any suitable I/O device for entering information into a mobile computing device. Examples for I/O device 606 include an alphanumeric keyboard, a numeric keypad, a touch pad, input keys, buttons, switches, rocker switches, microphones, speakers, voice recognition device and software, and others. Information also can be entered into device 600 by way of microphone (not shown). Such information is digitized by a voice recognition device (not shown). The embodiments are not limited in this context.

Various embodiments can be implemented using hardware elements, software elements, or a combination of both. Examples of hardware elements include processors, microprocessors, circuits, circuit elements (e.g., transistors, resistors, capacitors, inductors, etc.), integrated circuits, application specific integrated circuits (ASIC), programmable logic devices (PLD), digital signal processors (DSP), field programmable gate array (FPGA), logic gates, registers, semiconductor device, chips, microchips, chip sets, and more. Examples of software include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements varies in accordance with any number of factors, such as desired computational rate, power levels, heat tolerances, processing cycle budget, input data rates, output data rates, memory resources, data bus speeds, and other design or performance constraints.

One or more aspects of at least one embodiment can be implemented by representative instructions stored on a machine-readable medium that represents various logic within the processor, which when read by a machine causes the machine to fabricate logic to perform the techniques described herein. Such representations, known as "IP cores" can be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are demonstrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

Additional and Alternative Implementation Notes

As used herein, a portable device may be called a wireless device, mobile device, handset, handheld device, or the like. In general, a portable device is a small, hand-held, portable device that performs computational actions, offers a mechanism for user input, and/or offers a mechanism for output. Often, they are equipped with wireless communications capabilities, such as WiFi, Bluetooth, and cellular. Examples of implementations of a portable device include a laptop computer, a tablet computer, a netbook computer, a notebook computer, a smartphone, a handset, a gaming console, a personal digital assistant (PDA), a music player, a digital camera, a video camera, a multimedia device, a remote control, a touchscreen, a musical instrument digital interface (MIDI) keyboard, MIDI equipment, and a microphone.

Herein, a wireless peripheral device is a device that is wirelessly connected to a computer while it provides input to the computer or receives output from the computer. Often, the wireless peripheral devices are equipped with wireless communications capabilities, such as WiFi, Bluetooth, and cellular. Examples of implementations of a wireless peripheral device include a printer, a scanner, a plotter, an external data storage device, an external data retrieval device, a mouse, a keyboard, a monitor, a projector, a television, a touchscreen, a pen tablet, a joystick, a game controller, a musical instrument digital interface (MIDI) keyboard, MIDI equipment, a microphone, speakers, a media card reader, a digital mixer, a barcode reader, smartphone, a handset, an user input device, a personal digital assistant (PDA), a music player, a digital camera, a video camera, a webcam, a multimedia device, a remote control, a touchpad, and a touchscreen.

As used herein, WiFi refers to wireless signals based upon the IEEE 802.11 set of standards for implementing wireless local area network (WLAN) computer communication in the 2.4, 3.6 and 5 GHz frequency bands. These standards are created and maintained by the IEEE LAN/MAN Standards Committee (IEEE 802).

Bluetooth is a wireless technology standard for exchanging data over short distances. Zigbee is s a specification for a group of communication protocols using small, low-power digital radios based on an IEEE 802 standard for personal area networks. WiDi refers to a wireless display standard developed by Intel.

An example of an IWS sources is a wireless access point (WAP), which allows access to a wired network using WiFi, Bluetooth, Zigbee, or other such wireless communication standards. Another example of an IWS sources is a so-called mobile hotspot, which is a type of WAP that links portable devices to networks via a cellular data network communications.

The IWS sources are called ambient herein because they may be detected or "observed" in the environment by the portable device. The IWS sources are called "identifiable" because each is uniquely identifiable. For example, each WAP may be uniquely identified by its basic service set identification (BSSID) or media access card (MAC) address. Of course, other identifying characteristics may be used alone or in combination with each other or with the BSSID or MAC address. Examples of such other identifying characteristics include service set identification (SSID) and received signal strength indication (RSSI).

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "computer-readable media" includes computer-storage media. For example, computer-storage media may include, but are not limited to, magnetic storage devices (e.g., hard disk, floppy disk, and magnetic strips), optical disks (e.g., compact disk [CD] and digital versatile disk [DVD]), smart cards, flash memory devices (e.g., thumb drive, stick, key drive, and SD cards), and volatile and nonvolatile memory (e.g., RAM and ROM).

The invention claimed is:

1. A portable device comprising:
    a wireless-peripheral detector configured to detect a usage of a particular wireless peripheral device by a portable device, wherein the wireless-peripheral detector is further configured to track timing information about the usage includes at least a frequency or duration of use by the portable device of the particular wireless peripheral device;
    a WiFi-fingerprint determiner configured determine one or more WiFi fingerprints about the portable device, wherein the one or more WiFi fingerprints are defined, at least in part, by one or more observed ambient identifiable wireless signal (IWS) sources about the portable device while the wireless-peripheral detector detects the usage of a particular wireless peripheral device;
    a fingerprint-peripheral database configured to:
        associate the particular wireless peripheral device with the one or more WiFi fingerprints and detected timing information about the usage of the particular wireless peripheral device; and
        store the association into the fingerprint-peripheral database.

2. A portable device as recited by claim 1 further comprising a location determiner configured to determine a geo-physical location based upon the one or more determined WiFi fingerprints.

3. A portable device as recited by claim 1, wherein the ambient IWS sources include wireless access points.

4. A portable device as recited by claim 2, wherein the fingerprint-peripheral database is further configured to store the association of the detected timing information about the usage of the particular wireless peripheral device with the association of the particular wireless peripheral device and the determined geo-physical location of the wireless peripheral device.

5. A portable device as recited by claim 1, wherein the portable devices is a wireless device selected from a group consisting of a laptop computer, a tablet computer, a netbook computer, a notebook computer, a smartphone, a handset, a gaming console, a personal digital assistant (PDA), a music player, a digital camera, a video camera, a multimedia device, a remote control, a touchscreen, a musical instrument digital interface (MIDI) keyboard, MIDI equipment, and a microphone.

6. A portable device as recited by claim 1, wherein the particular peripheral devices is a wireless device selected from a group consisting of a printer, a scanner, a plotter, an external data storage device, an external data retrieval device, a mouse, a keyboard, a monitor, a projector, a television, a touchscreen, a pen tablet, a joystick, a game controller, a musical instrument digital interface (MIDI) keyboard, MIDI equipment, a microphone, speakers, a media card reader, a digital mixer, a barcode reader, smartphone, a handset, an user input device, a personal digital assistant (PDA), a music player, a digital camera, a video camera, a webcam, a multimedia device, a remote control, a touchpad, and a touchscreen.

7. A portable device as recited by claim 1 further comprising a communications unit configured to send the association between usage of the particular wireless peripheral device and the one or more determined WiFi fingerprints about the portable device across a network for storage in a remote database, that remote database being the fingerprint-peripheral database.

8. A portable device comprising:
a WiFi-fingerprint determiner configured to determine one or more WiFi fingerprints about the portable device, wherein the one or more WiFi fingerprints are defined, at least in part, by one or more observed ambient identifiable wireless signal (IWS) sources about the portable device;
a fingerprint-peripheral database configured to:
find information about prior usage of one or more wireless peripheral devices in the fingerprint-peripheral database, the finding being based on a stored association of the one or more determined WiFi fingerprints with the information about prior usage of the one or more wireless peripheral devices in the fingerprint-peripheral database;
a wireless-peripheral detector configured to:
select a particular wireless peripheral device of the one or more wireless peripheral devices that have information about prior usage associated with one or more determined WiFi fingerprints;
wirelessly connect the portable device to the selected particular wireless peripheral device.

9. A portable device as recited by claim 8, wherein the wireless-peripheral detector is further configured to prioritize the one or more wireless peripheral devices based upon the prior-usage information of the one or more wireless peripheral devices, wherein the selected particular wireless peripheral devices has the highest priority.

10. A portable device as recited by claim 8, further comprising a location determiner configured to determine a geo-physical location based upon the one or more determined WiFi fingerprints.

11. A portable device as recited by claim 8, wherein the ambient IWS sources include wireless access points.

12. A portable device as recited by claim 8 further comprising:
a graphics subsystem configured to display, in a user-interface, a listing of one or more wireless peripheral devices in an order based upon the prioritizing;
a user input subsystem configured to receive input from a user that indicates which of the one or more listed wireless peripheral devices that the user chooses to use.

13. A portable device as recited by claim 8, wherein the selection occurs without specific input from a user to choose the particular wireless peripheral device.

14. One or more computer-readable media with processor-executable instructions stored thereon which when executed by one or more processors cause performance of operations comprising:
detecting usage of a particular wireless peripheral device by a portable device, wherein the timing information about the usage includes at least a frequency or duration of use by the portable device of the wireless peripheral device;
determining a WiFi fingerprint about the portable device, wherein the one or more WiFi fingerprints are defined, at least in part, by one or more observed ambient identifiable wireless signal (IWS) sources about the portable device while the wireless-peripheral detector detects the usage of a particular wireless peripheral device;
associating the particular wireless peripheral device with the determined WiFi fingerprint;
storing the association between the particular wireless peripheral device and the determined WiFi fingerprint into the fingerprint-peripheral database.

15. One or more computer-readable media as recited by claim 14, further comprising a location determiner configured to determine a geo-physical location based upon the determined WiFi fingerprint.

16. One or more computer-readable media as recited by claim 14, wherein storing also includes storing an association of timing information about the usage of the particular wireless peripheral device with the determined WiFi fingerprint in the fingerprint-peripheral database.

17. One or more computer-readable media as recited by claim 14, wherein the portable devices are wireless devices selected from a group consisting of a laptop computer, a tablet computer, a netbook computer, a notebook computer, a smartphone, a handset, a gaming console, a personal digital assistant (PDA), a music player, a digital camera, a video camera, a multimedia device, a remote control, a touchscreen, a musical instrument digital interface (MIDI) keyboard, MIDI equipment, and a microphone.

18. One or more computer-readable media as recited by claim 14, wherein the wireless peripheral devices are wireless devices selected from a group consisting of a printer, a scanner, a plotter, an external data storage device, an external data retrieval device, a mouse, a keyboard, a monitor, a projector, a television, a touchscreen, a pen tablet, a joystick, a game controller, a musical instrument digital interface (MIDI) keyboard, MIDI equipment, a microphone, speakers, a media card reader, a digital mixer, a barcode reader, smartphone, a handset, an user input device, a personal digital assistant (PDA), a music player, a digital camera, a video camera, a webcam, a multimedia device, a remote control, a touchpad, and a touchscreen.

19. One or more computer-readable media as recited by claim 14, wherein the storing includes sending the association between the particular wireless peripheral device and the determined WiFi fingerprint across a network for storage in a remote database, that remote database being the fingerprint-peripheral database.

20. One or more computer-readable media with processor-executable instructions stored thereon which when executed by one or more processors cause performance of operations comprising:
determining one or more present WiFi fingerprints about a portable device;
matching the one or more present WiFi fingerprints with one or more WiFi fingerprints that are stored in a fingerprint-peripheral database;

obtaining an association between usage of one or more wireless peripheral devices with the one or more matching WiFi fingerprints in the fingerprint-peripheral database;

acquiring information about prior usage of the one or more wireless peripheral devices from the fingerprint-peripheral database, the prior-usage information being stored in association with one or more stored WiFi fingerprints and the one or more wireless peripheral devices in the fingerprint-peripheral database;

selecting a particular wireless peripheral device of the one or more wireless peripheral devices based upon acquired information about prior usage associated with one or more stored WiFi fingerprints;

wirelessly connect the portable device to the one or more selected particular wireless peripheral devices.

21. One or more computer-readable media as recited by claim 20, further comprising a location determiner configured to determine a geo-physical location based upon the determined WiFi fingerprint.

22. One or more computer-readable media as recited by claim 20 further comprising:

displaying, in a user-interface, a listing of one or more wireless peripheral devices in an order based upon the prioritizing;

receiving input from a user that indicates which of the one or more listed wireless peripheral devices that the user chooses to use.

23. One or more computer-readable media as recited by claim 20 further comprising:

the selection occurs without specific input from a user to choose the particular highest priority wireless peripheral device.

24. One or more computer-readable media as recited by claim 20, wherein the ambient IWS sources include wireless access points.

25. One or more computer-readable media as recited by claim 20, wherein the obtaining includes receiving the association across a network from a storage in a remote database, that remote database being the fingerprint-peripheral database.

* * * * *